United States Patent [19]

Cho

[11] Patent Number: 5,712,686
[45] Date of Patent: Jan. 27, 1998

[54] INVERSE QUANTIZER FOR USE IN MPEG-2 DECODER

[75] Inventor: Young-Chul Cho, Seoul, Rep. of Korea

[73] Assignee: Daewoo Electronics Co., Ltd., Seoul, Rep. of Korea

[21] Appl. No.: 774,831

[22] Filed: Dec. 27, 1996

[30] Foreign Application Priority Data

Dec. 30, 1995 [KR] Rep. of Korea .............. 95-69157

[51] Int. Cl.$^6$ .................................................. H04N 7/40
[52] U.S. Cl. ................... 348/405; 341/106; 348/419
[58] Field of Search .......................... 348/405, 419; 341/106; H04N 7/40

[56] References Cited

U.S. PATENT DOCUMENTS

| | | | |
|---|---|---|---|
| 5,089,888 | 2/1992 | Zdepski | 348/405 |
| 5,295,077 | 3/1994 | Fukuoka | 348/405 |
| 5,426,463 | 6/1995 | Reininger | 348/405 |

*Primary Examiner*—Howard W. Britton
*Attorney, Agent, or Firm*—Pennie & Edmonds, LLP

[57] ABSTRACT

An inverse quantizer, for use in an MPEG-2 video signal decoder, provides a 23-bit inverse quantized transform coefficient F in response to 13-bit (2QF+K), according to F=[(2QF+K)×(W×quantizer_scale)]/32 wherein QF is a quantized transform coefficient, W is an element of a predetermined weight matrix, and the quantizer_scale is an integer ranging from 1 to 112 as given in MPEG-2 scheme. The inverse quantizer comprises a quantizer_scale providing block for providing a (7-L)-bit modified quantizer_scale and a selection signal based on the quantizer_scale; a first multiplier for multiplying the modified quantizer_scale with W, to provide a (15-L)-bit quantization step size; a second multiplier for multiplying (2QF+K) with the quantization step size, to provide a (28-L) bit output; a bit appending block for appending L zero bits to the output of the second multiplier, to provide a set of (L+1) 28-bit values; a multiplexor for selecting one of the (L+) 28-bit values in response to the selection signal; and a divider for dividing the selected 28-bit value by "$2^5$", to thereby provide 23-bit F.

20 Claims, 4 Drawing Sheets

INVERSE QUANTIZER FOR USE IN MPEG-2 DECODER

FIELD OF THE INVENTION

The invention relates to a video signal decoding apparatus; and, more particularly, to an inverse quantizer for use in an MPEG-2 decoder.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amounts of digital data through the fixed channel, a video signal encoding apparatus is normally used to compress the digital data.

Conventional video signal encoding apparatus typically includes a transform coder, e.g., DCT (Discrete Cosine Transform) coder, which sequentially converts a plurality of blocks of, e.g., 8×8, pixels contained in a video frame signal into a plurality of blocks of 8×8 transform coefficients. The blocks of transform coefficients are sequentially processed with a quantizer wherein they are converted into quantized transform coefficients as set forth in the video coding syntax of ISO/IEC 13818-2, Committee Draft prepared by Motion Picture Expert Group (MPEG), which is also known as an MPEG-2 scheme.

Actually, MPEG-2 regulates an inverse quantizer, for use in a video signal decoder, for inverse quantizing QF[V][U], i.e., a quantized transform coefficient, inputted thereto from, e.g., a variable length decoder and an inverse scanner on a block-by-block basis, QF[V][U] being determined from an encoded data stream provided to the decoder from a corresponding encoder. The inverse quantizer provides inverse quantized transform coefficient F"[V][U] which is determined as follows:

$$F''[V][U]=[(2QF[V][U]+K) \times (W[V][U] \times \text{quantizer\_scale})]/32 \quad K=0$$
for intra blocks $K=\text{Sign}(QF[V][U])$ for non-intra blocks Eq. (1)

wherein V and U represent a position in an 8×8 block; W[V][U] is an element of an 8×8 weight matrix corresponding to QF[V][U], the weight matrix being predefined or downloaded from the encoder; the quantizer_scale is determined as shown in Table 1 hereof based on "quantizer_scale_code" and "q_scale_type" which are obtained from the encoded data stream; "/" represents an integer division with truncation of the result toward Zero; and Sign(X) is a function of a variable X defined as:

$$\text{Sign}(X) = \begin{cases} -1, & X > 0 \\ 0, & X = 0 \\ 1, & X < 0. \end{cases}$$

As specified in MPEG-2 scheme, QF[V][U] ranges from −2047 to 2047 and, therefore, "2QF[V][U]+K" may be represented by using 13 bits; W[V][U] is an 8-bit integer; and the quantizer_scale ranges from 1 to 112 and, therefore, can be represented with 7 bits.

After the quantization, the inverse quantized transform coefficient F"[V][U] is subject to other procedures such as saturation, mismatch control, inverse DCT, and so on.

Referring to FIG. 1, there is shown a block diagram of a conventional inverse quantizer in accordance with the MPEG-2 scheme described above, which includes two multipliers 20 and 30, a quantizer_scale providing block 10, and a divider 40.

The quantizer_scale providing block 10 provides the quantizer_scale as specified in Table 1, to the multiplier 20 in response to the quantizer_scale_code and the q_scale_type which are decided from the encoded data stream and provided thereto. From Table 1, it can be seen that the quantizer_scale providing block 10 may be implemented as a lookup table, equivalent to a 64×7 ROM(Read Only Memory).

Then, the 7-bit quantizer_scale is multiplied with the 8-bit W[V][U] at the multiplier 20, to thereby provide a 15-bit quantization step size to the multiplier 30. An input value "2QF[V][U]+K" is coupled to the multiplier 30 and multiplied with the quantization step size therein, to thereby provide 28-bit data to the divider 40. At the divider 40, the 28-bit data is divided by $2^5$, to thereby provide the 23-bit inverse quantized transform coefficient.

As described above, the conventional inverse quantizer uses multipliers and a divider which can deal with data having many bits, to thereby render the production cost thereof rather high.

TABLE 1

<Relation between quantizer_scale and quantizer_scale_code>

| | quantizer_scale | |
|---|---|---|
| quantizer_scale_code | q_scale_type = 0 | q_scale_type = 1 |
| 0 | | |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

SUMMARY OF THE INVENTION

It is, therefore, a primary object of this invention to provide an improved inverse quantizer which is constructed with multipliers dealing with a smaller number of bits, to thereby lower the implementation cost thereof.

In accordance with the invention, there is provided an apparatus, for use in an MPEG-2 video signal decoder, for providing an N1-bit inverse quantized transform coefficient F in response to an N2-bit input value MQF, according to $$F = [MQF \times (W \times \text{quantizer\_scale})]/32$$

wherein the quantizer_scale is an integer ranging from $2^0$ to $2^M - 1$ M being a positive integer, and W is a (N1+5-N2-M)-bit predefined value, the apparatus comprising:

- a quantizer_scale providing block for generating a (M-L)-bit modified quantizer_scale and a selection signal based on the quantizer_scale, L being an integer ranging from 1 to (M-1);
- a first multiplier for multiplying the modified quantizer_scale with W, to provide a (N1+5-N2-L)-bit quantization step size;
- a second multiplier for multiplying the N2-bit input value with the quantization step size, to provide an (N1+5-L)-bit first value;
- a bit appending block for appending L zero bits to the first value, to provide (L+1) (N1+5)-bit second values;
- a multiplexor for selecting one of the (L+1) (N1+5)-bit second values in response to the selection signal; and
- a divider for dividing the selected second value provided from the multiplexor by $2^5$, to thereby provide the N1-bit inverse quantized transform coefficient.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Referring back to Table 1, it is noted that the quantizer_scale can be represented with less than 6 bits except when it has one of underlined values, 64, 72, 80, . . . , 112 (or equivalently, the quantizer_scale_code is one of values 25 to 31 and the q_scale_type is "1"). In addition, all of the underlined values are multiples of 2. Therefore, if quantizer_scale/2 is used instead of the quantizer_scale for the underlined cases, quantizer_scale can be expressed as 6 bits. Accordingly, Eq. (1) can be modified as follows:

Case 1: if quantizer_scale < 64  Eq. (2A)
$F'[V][U] =$
$[(2QF[V][U] + K) \times (W[V][U] \times \text{quantizer\_scale'})]/32$
quantizer_scale' = quantizer_scale Case 2: if 64 ≤ quantizer_scale  Eq. (2B)
$F'[V][U] =$
$\{[(2QF[V][U] + K) \times (W[V][U] \times \text{quantizer\_scale'})] \times 2\}/32$
quantizer_scale' = quantizer_scale/2

Figure 1:
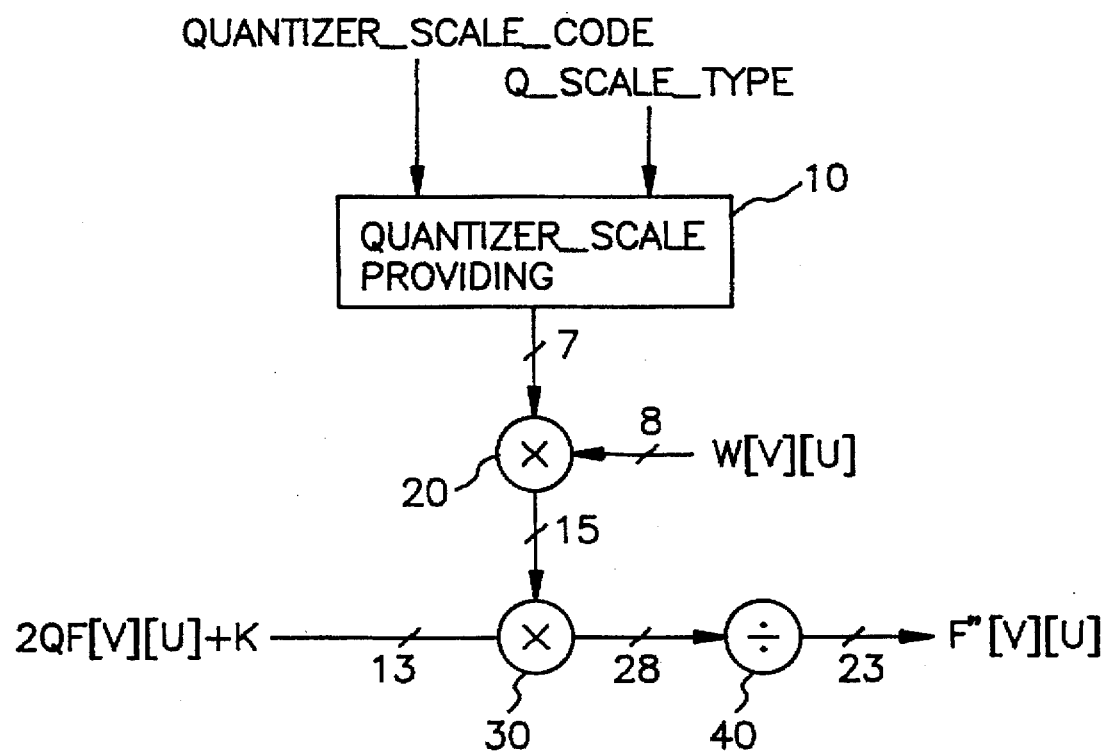
FIG. 1 is a block diagram of a conventional inverse quantizer.
Figure 2A:
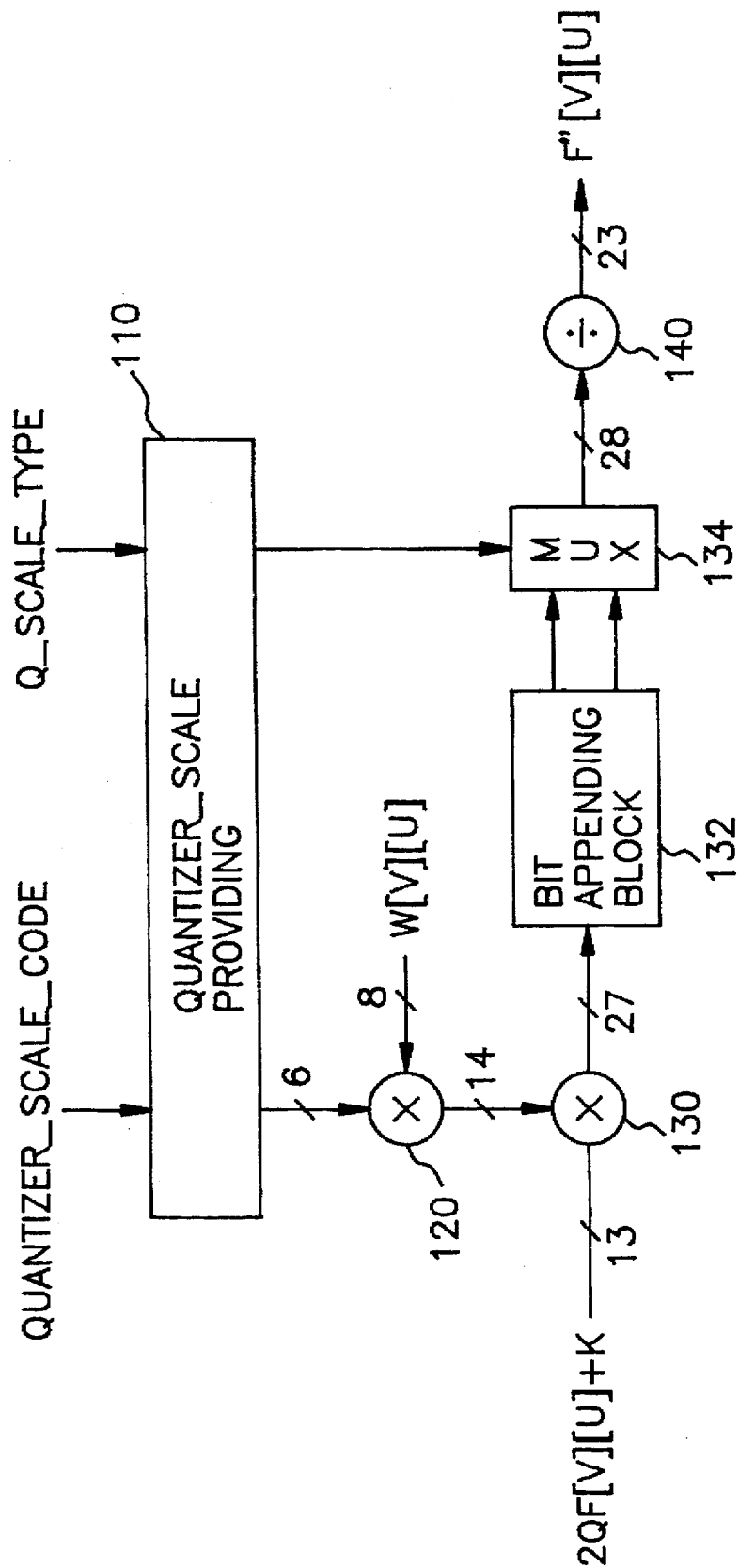
FIGS. 2A and 2B show block diagrams of an inverse quantizer in accordance with a first preferred embodiment of the present invention.

Referring to FIG. 2A, there is shown a block diagram of an inverse quantizer 200 in accordance with a first preferred embodiment of the present invention, which selectively performs the operation given in Eq. (2A) or (2B). Similar to the conventional inverse quantizer shown in FIG. 1, it includes a quantizer_scale providing block 110, two multipliers 120 and 130 and a divider 140. The quantizer_scale providing block 110 provides a modified quantizer_scale (quantizer_scale' in Eqs. (2A) and (2B)) instead of the quantizer_scale given in Table 1 to the multiplier 120, in response to the quantizer_scale_code and the q_scale_type, wherein the modified quantizer_scale for any of the underlined cases (case 2) in Table 1 is given by the quantizer_scale therein divided by 2 and it is identical to the quantizer_scale in Table 1 for the remaining cases (case 1). Accordingly, all values of the modified quantizer_scale can be represented with 6 bits. The quantizer_scale providing block 110 also provides a selection signal identifying either of the case 1 or 2 to a multiplexor 134. The quantizer_scale providing block 110 may include a lookup table, equivalent to a 64×6 ROM and a supplementary circuitry for providing the selection signal.

Then, the 6-bit modified quantizer_scale is multiplied with 8-bit W[V][U] at the multiplier 120, to thereby provide a 14-bit quantization step size to the multiplier 130. The 13-bit "2QF[V][U]+K" is inputted to the multiplier 130 and multiplied by the 14-bit quantization step size therein, to thereby provide 27-bit data to a bit appending block 132. The bit appending block 132 outputs two 28-bit data (which will be referred to as an MSB (Most Significant Bit) appended data and an LSB (Least Significant Bit) appended data) to a multiplexor 134 by appending a zero bit, i.e., a bit having "0" value, in front of an MSB and next to an LSB, respectively, of the 27-bit data provided from the multiplier 130. For example, if "101 11010001 01101010 11001100" is provided to the bit appending block 132, the MSB appended data and the LSB appended data are "0101 11010001 01101010 11001100" and "1011 10100010 11010101 10011000", respectively, wherein the underlined bit represent the appended bit. It is noted that while the MSB appended data is identical to the original data before appending, the LSB appended data is equivalent to the original data multiplied by 2.

At the multiplexor 134, one of the two 28-bit data is selected in response to the selection signal provided from the quantizer_scale providing block 110. Specifically, for the case 2, the LSB appended data is selected, and for the case 1, the MSB appended data is selected. Since the bit appending block 132 and the multiplexor 134 compensate the effect of division by 2 of the quantizer_scale for the case 2, the 28-bit data provided from the multiplexor 134 is identical to the output of the multiplier 30 shown in FIG. 1.

At the divider 140, the 28-bit data is divided by $2^5$, to thereby provide the 23-bit inverse quantized data F"[V][U].

As described above, by using the 6-bit modified quantizer_scale instead of the 7-bit quantizer scale, the two multipliers 120 and 130 can be implemented with a 6-bit by 8-bit multiplier and a 14-bit by 13-bit multiplier, respectively, which can be more easily constructed than the conventional 7-bit by 8-bit and 15-bit by 13-bit multipliers.

In a similar manner, Eq. (1) can be further modified as follows:

Case 3: if quantizer_scale < 32  Eq. (3A)
$F"[V][U] =$
$[(2QF[V][U] + K) \times (W[V][U] \times \text{quantizer\_scale"})]/32$
quantizer_scale" = quantizer_scale Case 4: if 32 ≤ quantizer_scale < 64  Eq. (3B)

-continued $F''[V][U] = \{[(2QF[V][U] + K) \times (W[V][U] \times \text{quantizer\_scale'})] \times 2\}/32$
quantizer_scale" = quantizer_scale/2

Case 5: if 64 < quantizer_scale  Eq. (3C)
$F''[V][U] = \{[(2QF[V][U] + K) \times (W[V][U] \times \text{quantizer\_scale"})] \times 4\}/32$
quantizer_scale" = quantizer_scale/4

Figure 2B:
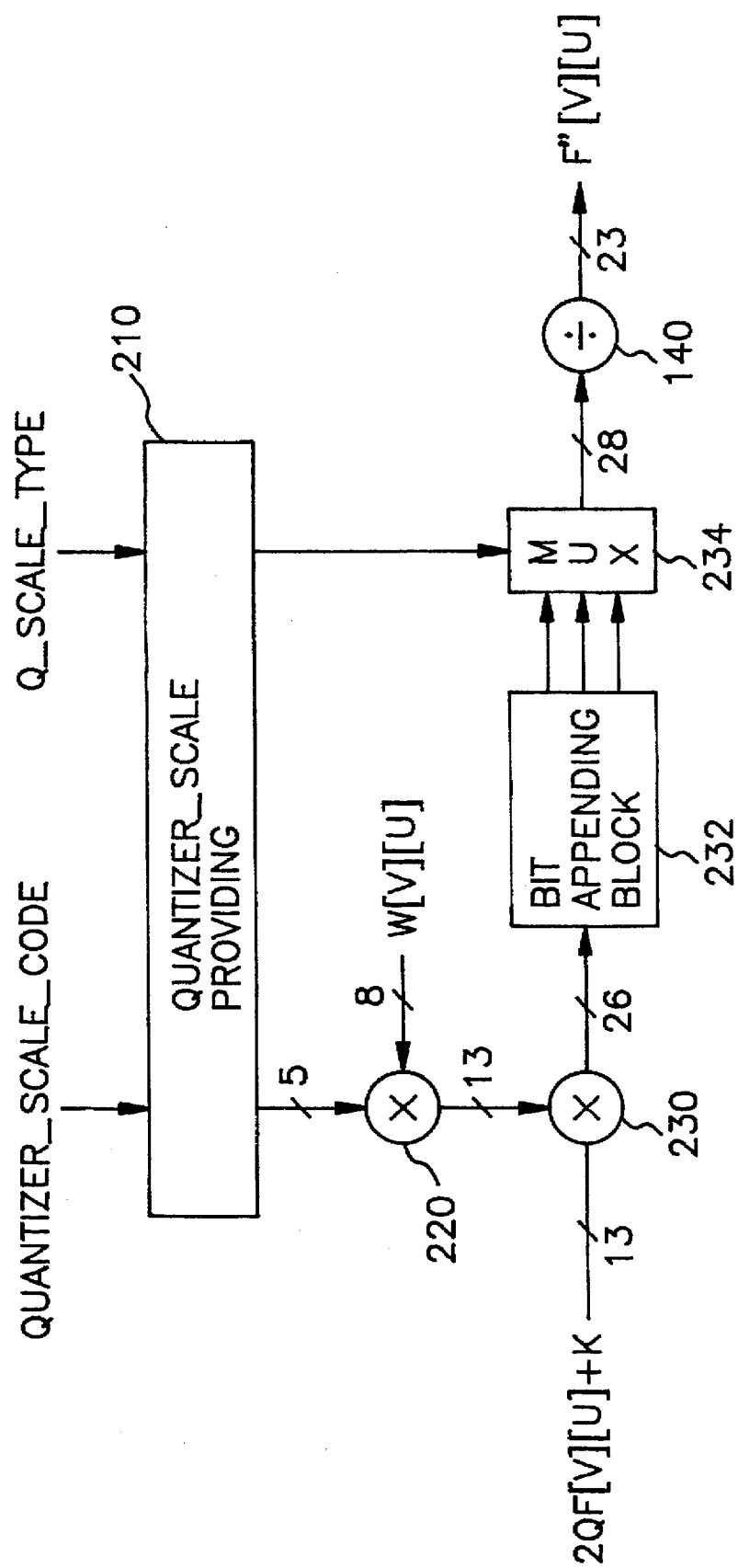

Referring to FIG. 2B, there is shown an inverse quantizer 300 which performs the operation given in one of Eqs. (3A) to (3C). The functions of blocks included in the inverse quantizer 300 is similar to those of the corresponding blocks shown in FIG. 2A. However, in the inverse quantizer 300, a modified quantizer_scale (quantizer_scale") provided from the quantizer_scale providing block 210 is represented with 5 bits, and therefore, the quantization step size provided from the multiplier 220 is represented with 13 bits. In addition, the bit appending block 232 provides three 28-bit data to a multiplexor 234, by appending 2 zero bits next to an LSB, 1 bit next to an LSB and 1 bit in front of an MSB, and 2 bits in front of an MSB, respectively, of the 26-bit data provided from the multiplier 230. At the multiplexor 234, one of the three 28-bit data is selected in response to a selection signal provided from the quantizer_scale providing block 210.

At the divider 240, the 28-bit data is divided by $2^5$, to thereby provide the 23-bit inverse quantized transform coefficient F"[V][U]. By using the 5-bit modified quantizer_scale instead of the 7-bit quantizer_scale, the two multipliers 220 and 230 can be implemented with a 5-bit by 8-bit multiplier and a 13-bit by 13-bit multiplier, respectively, which can be more easily constructed than those shown in FIG. 1 or 2A.

In a similar manner, it is possible to modify the structure of the inverse quantizer so that a 4-bit modified quantizer_scale may be used by classifying Table 1 into 4 cases.

Figure 3:
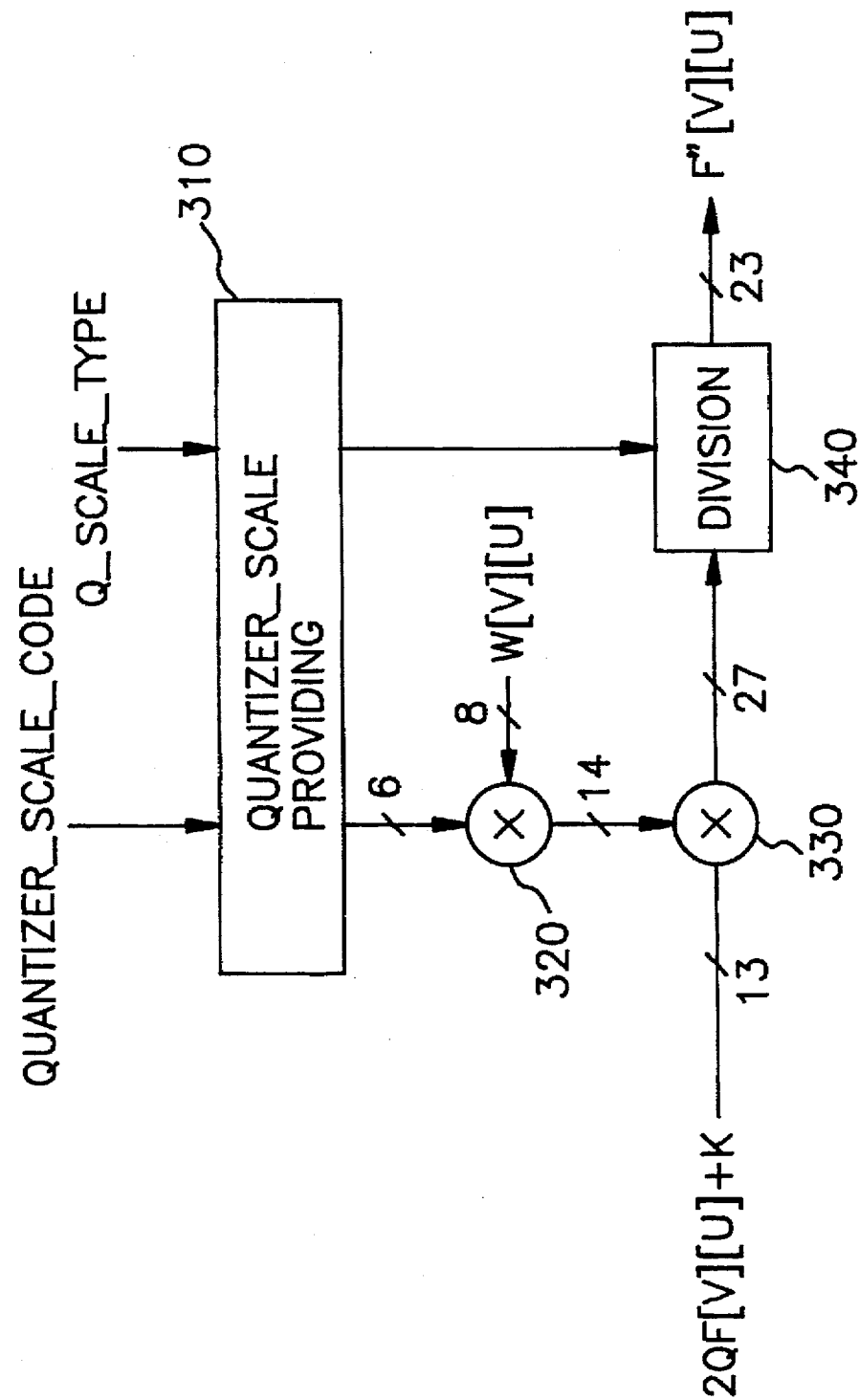
FIG. 3 describes a block diagram of an inverse quantizer in accordance with a second preferred embodiment of the present invention.

Referring to FIG. 3, there is shown a block diagram of an inverse quantizer 400 in accordance with a second embodiment of the present invention. In this embodiment, Eq. (1) is modified as follows:

Case 1: if quantizer_scale < 64  Eq. (4A)
$F''[V][U] = [(2QF[V][U] + K) \times (W[V][U] \times \text{quantizer\_scale'})]/32$
quantizer_scale' = quantizer_scale Case 2: if 64 ≤ quantizer_scale  Eq. (4B)
$F''[V][U] = [(2QF[V][U] + K) \times (W[V][U] \times \text{quantizer\_scale'})]/16$
quantizer_scale' = quantizer_scale/2

The inverse quantizer 400 includes a quantizer_scale providing block 310, two multipliers 320 and 330 and a division block 340, wherein the two multipliers 320 and 330 may be implemented as a 6-bit by 8-bit multiplier and a 14-bit by 13-bit multiplier, respectively.

The quantizer_scale providing block 310 provides a 6 bit modified quantizer_scale (quantizer_scale' in Eqs. (4A) and (4B)) to the multiplier 320 in response to the quantizer_scale_code and the q_scale_type. It also provides a selection signal to the division block 340 which is identical to the selection signal shown in FIG. 2A.

Then, the 6-bit modified quantizer_scale is multiplied with 8-bit W[V][U] at the multiplier 320, to thereby provide a 14-bit quantization step size to the multiplier 330. The 13-bit "2QF[V][U]+K" is inputted to the multiplier 330 and multiplied with the 14-bit quantization step size therein, to thereby provide 27-bit data to the division block 340.

At the division block 340, the 27-bit data is divided by either $2^5$ or $2^4$ in response to the selection signal provided from the quantizer_scale providing block 310, to thereby provide the 23-bit inverse quantized data F"[V][U]. Specifically, for case 1, the 27-bit data is divided by $2^5$ to form a 22-bit data and a zero bit is appended in front of an MSB thereof, to form the 23-bit inverse quantized data F"[V][U]; and for case 2, the 27-bit data is divided by $2^4$ to form the 23-bit inverse quantized data F"[V][U].

Similar to the first embodiment, it is possible to modify the structure of the inverse quantizer 400 so that a 5 or 4-bit modified quantizer_scale may be used by classifying Table 1 into 3 or 4 cases.

As described above, by modifying the equation for the inverse quantization, the inverse quantizer may be constructed by using less complicated multipliers, to thereby reduce the overall cost of production.

While the present invention has been described with respect to certain preferred embodiments only, other modifications and variations may be made without departing from the spirit and scope of the present invention as set forth in the following claims.

What is claimed is:

1. An apparatus, for use in an MPEG-2 video signal decoder, for providing an N1-bit inverse quantized transform coefficient F in response to an N2-bit input value MQF, N1 and N2 being positive integers, respectively, according to $F=[MQF \times (W \times \text{quantizer\_scale})]/32$ wherein the quantizer_scale is an integer ranging from $2^0$ to $2^M-1$, M being a positive integer, and W is an (N1+5-N2-M)-bit predefined value, the apparatus comprising:

means for generating an (M-L)-bit modified quantizer_scale and a selection signal based on the quantizer_scale, L being an integer ranging from 1 to (M-1);

first multiplication means for multiplying the modified quantizer_scale with said W, to provide an (N1-N2+5-L)-bit quantization step size;

second multiplication means for multiplying the N2-bit input value with the quantization step size, to provide an (N1+5-L)-bit first value;

means for appending L zero bits to the first value, to provide (L+1) (N1+5)-bit second values;

means for selecting one of the (L+1) (N1+5)-bit second values in response to the selection signal provided from the generating means; and means for dividing the selected second value provided from the selection means by $2^5$, to thereby provide the N1-bit inverse quantizer transform coefficient.

2. The apparatus of claim 1, wherein the N2-bit input value is (2QF+K), QF being a quantized transform coefficient and K being a predetermined integer.

3. The apparatus of claim 1, wherein said N1 is 23, and said N2 is 13.

4. The apparatus of claim 1, wherein said M is 7.

5. The apparatus of claim 1, wherein said L is 1 and the quantizer_scale is an even number in case the quantizer_scale is not less than $2^{M-1}$.

6. The apparatus of claim 5, wherein the appending means appends a zero bit in front of an MSB (most significant bit) and next to an LSB (least significant bit) of the first value, respectively, to provide the two second values.

7. The apparatus of claim 6, wherein the generating means provides the quantizer_scale as the modified quantizer_scale in case the quantizer_scale is less than $2^{M-1}$; and provides the quantizer_scale divided by 2 as the modified quantizer_scale in case the quantizer_scale is not less than $2^{M-1}$.

8. The apparatus of claim 1, wherein said L is 2, the quantizer_scale is an even number in case the quantizer_scale is not less than $2^{M-2}$ and less than $2^{M-1}$; and the quantizer_scale is a multiple of 4 in case the quantizer_scale is not less than $2^{M-1}$.

9. The apparatus of claim 8, wherein the appending means appends two zero bits in front of an MSB of the first value, appends two zero bits next to an LSB of the first value, and appends each of two zero bits in front of the MSB and next to the LSB of the first value, respectively, to provide the three second values.

10. The apparatus of claim 9, wherein the generating means provides the quantizer_scale as the modified quantizer_scale in case the quantizer_scale is less than $2^{M-2}$; provides the quantizer_scale divided by 2 as the modified quantizer_scale in case the quantizer_scale is not less than $2^{M-2}$ and less than $2^{M-1}$; and provides the quantizer_scale divided by 4 as the modified quantizer_scale in case the quantizer_scale is not less than $2^{M-1}$.

11. An apparatus, for use in an MPEG-2 video signal decoder, for providing an N1-bit inverse quantized transform coefficient F in response to an N2-bit input value MQF, N1 and N2 being positive integers, respectively, according to $$F=[MQF \times (W \times quantizer\_scale)]/32$$

wherein the quantizer_scale is an integer ranging from $2^0$ to $2^{M-1}$, M being a positive integer, and W is an (N1+5-N2-M)-bit predefined value, the apparatus comprising:

means for generating an (M-L)-bit modified quantizer_scale and a selection signal based on the quantizer_scale, L being an integer ranging from 1 to (M-1);

first multiplication means for multiplying the modified quantizer_scale with said W, to provide an (N1-N2+5-L)-bit quantization step size;

second multiplication means for multiplying the N2-bit input value with the quantization step size, to provide an (N1+5-L)-bit first value; and means for providing the N1-bit inverse quantized transform coefficient in response to the first value and the selection signal.

12. The apparatus of claim 11, wherein the N2-bit input value is (2QF+K), QF being a quantized transform coefficient and K being a predetermined integer.

13. The apparatus of claim 11, wherein said N1 is 23, and said N2 is 13.

14. The apparatus of claim 11, wherein said M is 7.

15. The apparatus of claim 11, wherein said L is 1 and the quantizer_scale is an even number in case the quantizer_scale is not less than $2^{M-1}$.

16. The apparatus of claim 15, wherein the generating means provides the quantizer_scale as the modified quantizer_scale in case the quantizer_scale is less than $2^{M-1}$ and provides the quantizer_scale divided by 2 as the modified quantizer_scale in case the quantizer_scale is not less than $2^{M-1}$.

17. The apparatus of claim 16, wherein the providing means divides the first value by $2^5$, to form (N1-1)-bit data and appends a zero bit in front of an MSB of the (N1-1)-bit data in case the quantizer_scale is less than $2^{M-1}$; and divides the first value by $2^4$ in case the quantizer_scale is not less than $2^{M-1}$, to thereby provide the N1-bit inverse quantized transform coefficient.

18. The apparatus of claim 11, wherein said L is 2, the quantizer_scale is an even number in case the quantizer_scale is not less than $2^{M-2}$ and less than $2^{M-1}$; and the quantizer_scale is a multiple of 4 in case the quantizer_scale is not less than $2^{M-1}$.

19. The apparatus of claim 18, wherein the generating means provides the quantizer_scale as the modified quantizer_scale in case the quantizer_scale is less than $2^{M-2}$; provides the quantizer_scale divided by 2 as the modified quantizer_scale in case the quantizer_scale is not less than $2^{M-2}$ and less than $2^{M-1}$; and provides the quantizer_scale divided by 4 as the modified quantizer_scale in case the quantizer_scale is not less than $2^{M-1}$.

20. The apparatus of claim 19, wherein the division means divides the first value by $2^5$, to form (N1-2)-bit data and appends 2 zero bits in front of an MSB of the (N1-2)-bit data in case the quantizer_scale is less than $2^{M-2}$; divides the first value by $2^4$, to form (N1-1)-bit data and appends a zero bit in front of an MSB of the (N1-1)-bit data in case the quantizer_scale is not less than $2^{M-2}$ and less than $2^{M-1}$; and divides the first value by $2^3$ in case the quantizer_scale is not less than $2^{M-1}$, to thereby provide the N1-bit inverse quantized transform coefficient.

* * * * *